US008573300B2

(12) United States Patent
Alsop et al.

(10) Patent No.: US 8,573,300 B2
(45) Date of Patent: Nov. 5, 2013

(54) REDUCING SULFIDE IN OIL RESERVOIR PRODUCTION FLUIDS

(75) Inventors: Albert W. Alsop, Wilmington, DE (US);
Robert D. Fallon, Elkton, MD (US);
Scott Christopher Jackson, Wilmington, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 142 days.

(21) Appl. No.: 13/226,744

(22) Filed: Sep. 7, 2011

(65) Prior Publication Data
US 2013/0056203 A1    Mar. 7, 2013

(51) Int. Cl.
*E21B 43/22* (2006.01)

(52) U.S. Cl.
USPC ........... 166/279; 166/246; 166/275; 166/300; 166/305.1

(58) Field of Classification Search
None
See application file for complete search history.

(56) References Cited

U.S. PATENT DOCUMENTS

| | | | |
|---|---|---|---|
| 5,405,531 A | 4/1995 | Hitzman et al. | |
| 5,750,392 A | 5/1998 | Hitzman et al. | |
| 5,789,236 A * | 8/1998 | Jenneman | 435/252.1 |
| 7,708,065 B2 | 5/2010 | Hendrickson et al. | |
| 7,776,795 B2 | 8/2010 | Keeler et al. | |
| 7,833,551 B2 | 11/2010 | Jenneman et al. | |
| 2009/0263887 A1 | 10/2009 | Keeler et al. | |

OTHER PUBLICATIONS

Griroryan et al., "Souring Remediation by Field-wide Nitrate Injection in an Alberta Oil Field", J. Can. Petrol. Technol., vol. 48 (2009) pp. 58-61.
Voordouw et al., "Sulfide Remediation by Pulsed Injection of Nitrate into a Low Temperature Canadian Heavy Oil Reservoir" Environ. Sci. Technol., vol. 43 (2009) pp. 9512-9518.
Agrawal, et al. (2011) Abstract Published in the 3rd International Symposium on Applied Microbiology and Molecular Biology in Oil Systems Jun. 13-15, 2011, Calgary, Alberta, Canada.
Cline, "Spectrophotometric Determination of Hydrogen Sulfide in Natural Waters", Limnol. Oceanogr. vol. 14, (1969) pp. 454-458.
An et al., "Simultaneous biodesulphurization and denittrification using an oil reservoir microbial culture: Effects of sulphide loading rate and sulphide to nitrate loading ratio", Water Research, vol. 44 (2010) pp. 1531-1541.
Lambo et al., "Competitive, Microbially-Mediated Reduction of Nitrate with Sulfide and Aromatic Oil Components in a Low-Temperature, Western Canadian Oil Reservoir", Environ. Sci. Technol., vol. 42 (2008) pp. 8941-8946.
Nemati et al., "Mechanistic Study of Microbial Control of Hydrogen Sulfide Production in Oil Reservoirs", Biotechnol. Bioeng., vol. 75, No. 5 (2001) pp. 424-434.

* cited by examiner

*Primary Examiner* — Zakiya W Bates

(57) ABSTRACT

Methods are provided for treating production fluid in an oil reservoir to reduce the amount of sulfide in the production fluid. The production fluid is treated with nitrate and/or nitrite ions in an aqueous solution that is added to an injection well that is in contact with the production well.

11 Claims, 1 Drawing Sheet

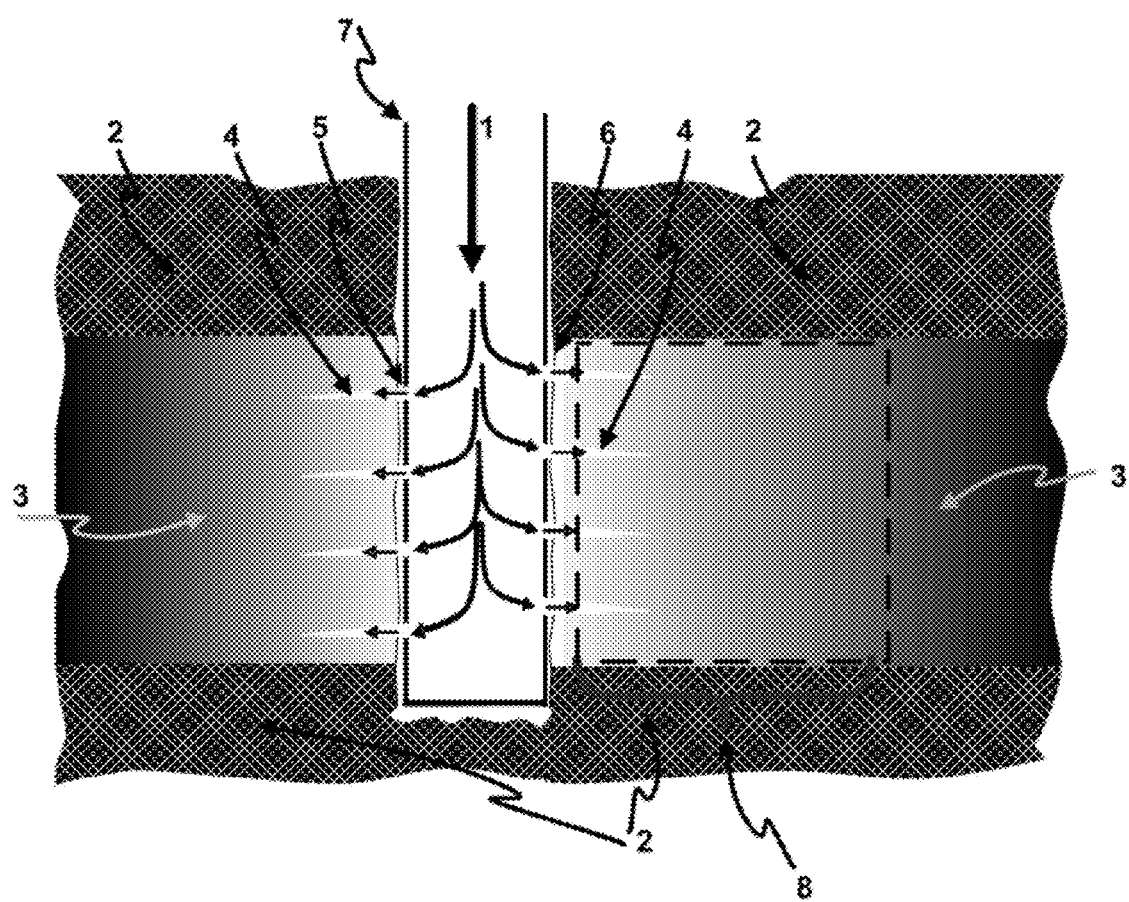

REDUCING SULFIDE IN OIL RESERVOIR PRODUCTION FLUIDS

FIELD OF THE INVENTION

This disclosure relates to the field of oil recovery. More specifically, it relates to reducing sulfide in production fluids recovered from oil reservoirs.

BACKGROUND OF THE INVENTION

Hydrogen sulfide ($H_2S$) is commonly found in oil reservoirs due to its production by sulfate-reducing bacteria (SRB), which may be indigenous to an oil reservoir and/or introduced such as during water injection in water flooding secondary oil recovery methods. The metabolism of these SRB converts sulfate that is typically present in injection water to sulfide, which results in souring of a reservoir and the oil produced, thereby reducing the value of the recovered crude oil. In addition sulfide in production water causes corrosion of equipment used to recover oil including storage reservoirs, surface facilities, and pipelines, and it can cause plugging by the formation of iron sulfide, as well as causing health and environmental hazards.

In oil reservoirs and in production and injection fluids either or both of SRB and nitrate-reducing bacteria (NRB) may be present, either as indigenous populations or through introduction. When both are present, there may be competition for nutrients between SRB and nitrate-reducing bacteria (NRB). The presence of SRB and NRB, the presence and types of nutrients available, as well as the balance of sulfate, nitrate, and nitrite are all factors affecting levels of sulfide in the reservoirs and fluids.

One method used to reduce sulfide has been to add nitrate to injection water that is administered field-wide to an oil reservoir through multiple injection wells (Griroryan et al. 2009 J. Can. Petrol Technol. 48:58-61). Injection of water containing nitrate has been tested in continuous or pulsed applications, and when introduced to a portion of a limited section of a reservoir, using nitrate at 150 ppm to 40,000 ppm (Voordouw et al. (2009) Environ. Sci. Technol. 43:9512-9518).

U.S. Pat. No. 5,405,531 discloses removing $H_2S$ and preventing SRB production of $H_2S$ in an aqueous system by introducing nitrite and nitrate and/or molybdate ions in concentrations where denitrifying microorganisms outcompete SRB for available nutrients. Generally less than about 3000 ppm of total nitrate and nitrite ions is added to the aqueous system that is then injected into an oil-bearing formation, more particularly between about 25 and 500 ppm. U.S. Pat. No. 7,833,551 discloses inhibiting sulfide production by SRB by treating SRB with a non-oxidizing biocide and a metabolic inhibitor, which requires lower concentrations of biocide and inhibitor than when each is used alone.

There remains a need for additional effective methods to reduce sulfide in production fluid.

SUMMARY OF THE INVENTION

The invention relates to methods that lead to reduced sulfide in production fluid obtained from an oil reservoir.

Accordingly, the invention provides a method for treating an oil reservoir comprising:
a) providing an injection well in an oil reservoir;
b) adding an aqueous solution comprising nitrate ions, nitrite ions, or a mixture of nitrate and nitrite ions to the injection well wherein said solution flows down the well and into the oil reservoir, and contacts a mixture of water and oil in the oil reservoir that forms production fluid; and
c) producing the production fluid through at least one production well that is in contact with the injection well;
wherein the sulfide concentration in the production fluid is reduced as compared to the sulfide concentration in production fluid obtained with omission of step (b).

BRIEF DESCRIPTION OF THE DRAWINGS

FIG. 1 is a schematic representation of an injection well, the subterranean sites adjacent to the injection well, and fluids in the well.

DETAILED DESCRIPTION

Applicants specifically incorporate the entire content of all cited references in this disclosure. Unless stated otherwise, all percentages, parts, ratios, etc., are by weight. Trademarks are shown in upper case. Further, when an amount, concentration, or other value or parameter is given as either a range, preferable range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The following definitions are provided for the special terms and abbreviations used in this application:

As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the specification and the claims.

As used herein, the term "about" modifying the quantity of an ingredient or reactant of the invention employed refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities. In one embodiment, the term "about" means within 10% of the reported numerical value, preferably within 5% of the reported numerical value.

The terms "oil reservoir", and "oil-bearing stratum" may be used herein interchangeably and refer to a subterranean or sub sea-bed formation from which oil may be recovered. The formation is generally a body of rocks and soil having sufficient porosity and permeability to store and transmit oil.

The term "well bore" refers to a channel from the surface to an oil-bearing stratum with enough size to allow for the pumping of fluids either from the surface into the oil-bearing stratum, called an "injection well", or from the oil-bearing stratum to the surface, called a "production well".

The terms "denitrifying" and "denitrification" mean reducing nitrate for use in respiratory energy generation.

The term "water flooding" refers to injecting water through well bores into an oil reservoir. Water flooding is performed to flush out oil from an oil reservoir when the oil no longer flows on its own out of the reservoir.

The term "sweep efficiency" relates to the fraction of an oil-bearing stratum that has seen fluid or water passing through it to move oil to production wells during water flooding. One problem that can be encountered with water flooding operations is the relatively poor sweep efficiency of the water, i.e., the water can channel through certain portions of a reservoir as it travels from injection well(s) to production well(s), thereby bypassing other portions of the reservoir. Poor sweep efficiency may be due, for example, to differences in the mobility of the water versus that of the oil, and permeability variations within the reservoir which encourage flow through some portions of the reservoir and not others.

The term "pure culture" means a culture derived from a single cell isolate of a microbial species. The pure cultures specifically referred to herein include those that are publicly available in a depository, and those identified herein.

The term "electron acceptor" refers to a molecular compound that receives or accepts an electron(s) during cellular respiration. Microorganisms obtain energy to grow by transferring electrons from an "electron donor" to an electron acceptor. During this process, the electron acceptor is reduced and the electron donor is oxidized. Examples of acceptors include oxygen, nitrate, fumarate, iron (III), manganese (IV), sulfate or carbon dioxide. Sugars, low molecular weight organic acids, carbohydrates, fatty acids, hydrogen and crude oil or its components such as petroleum hydrocarbons or polycyclic aromatic hydrocarbons are examples of compounds that can act as electron donors.

The term "biofilm" means a film or "biomass layer" of microorganisms. Biofilms are often embedded in extracellular polymers, which adhere to surfaces submerged in, or subjected to, aquatic environments. Biofilms consist of a matrix of a compact mass of microorganisms with structural heterogeneity, which may have genetic diversity, complex community interactions, and an extracellular matrix of polymeric substances.

The term "plugging biofilm" means a biofilm that is able to alter the permeability of a porous material, and thus retard the movement of a fluid through a porous material that is associated with the biofilm.

The term "simple nitrates" and "simple nitrites" refer to nitrate ($NO_3^-$) and nitrite ($NO_2^-$), respectively.

The term "bioplugging" refers to making permeable material less permeable due to the biological activity, particularly by a microorganism.

The term "injection water" refers to fluid injected into oil reservoirs for secondary oil recovery. Injection water may be supplied from any suitable source, and may include, for example, sea water, brine, production water, water recovered from an underground aquifer, including those aquifers in contact with the oil, or surface water from a stream, river, pond or lake. As is known in the art, it may be necessary to remove particulate matter including dust, bits of rock or sand and corrosion by-products such as rust from the water prior to injection into the one or more well bores. Methods to remove such particulate matter include filtration, sedimentation and centrifugation.

The term "production water" means water recovered from production fluids extracted from an oil reservoir. The production fluids contain both water used in secondary oil recovery and crude oil produced from the oil reservoir.

The term "inoculating an oil well" means injecting one or more microorganisms or microbial populations or a consortium into an oil well or oil reservoir such that microorganisms are delivered to the well or reservoir without loss of viability.

The term "souring" refers to an increase in free sulfide concentration with time, which can be measured by recording the $H_2S$ concentration in the gas phase of a sample.

The phrase "in contact with" as used in "production wells in contact with the injection well" refers herein to injection and production wells that have access to the same oil reservoir wherein fluid introduced in the injection well mixes with fluid that is then produced from the production well. There may be more than one injection well and more than one production well that are in contact via the oil reservoir.

The present invention relates to methods for reducing sulfide in production fluid that include adding a treatment solution that is an aqueous solution containing nitrate ions or nitrite ions or a mixture of nitrate and nitrite ions, where any of these compositions is herein called a "nitrate/nitrite solution", to an oil reservoir through an injection well. The treatment solution mixes with fluid in the oil reservoir whereby sulfide is removed by oxidation, reducing the sulfide content of production fluid produced from wells in contact with the injection well.

Nitrate/Nitrite Solution and Treatment

In the present method an aqueous solution containing nitrate ions and/or nitrite ions is added to an injection well of an oil reservoir. The total concentration of nitrate and/or nitrite ions is sufficient to reduce sulfide concentration in production fluid produced from one or more production wells in contact with the injection well. Introduction into the oil reservoir is shown in one embodiment that is diagrammed in FIG. 1.

The nitrate/nitrite treatment solution (1) flows into the water injection well casing (7) which is inside the well bore (5) drilled through rock layers (2 and 3). A gap exists between the well casing (7) and the face (6) of the rock layer made by the well bore (5). Rock layer (2) represents impermeable rock above and below a permeable rock layer (3) that holds or traps oil. The nitrate/nitrite treatment solution (1) flows down the well casing (7) and passes through perforations in the casing (5) and into fractures (4) in the permeable rock (3). This nitrate/nitrite treatment solution then flows through the permeable rock layer (3) and introduces the nitrite and/or nitrate ions to a watered zone (8) adjacent to the well bore. This zone extends radially out from the well bore (5) in all directions in the permeable rock layer (3). While the volume of permeable rock (3) encompassed by the dash line (8) is illustrated only on one side of the well bore it actually exists on all sides of the well bore. This watered zone represents the subterranean site adjacent to the water injection well, in which water and crude oil mix forming fluid that is produced from production wells ("production fluid"). The nitrate and/or nitrite ions in this mixture remove sulfide so that sulfide in production fluid is removed before it gets to the fluid processing unit on the surface.

The nitrate/nitrite solution is added to the injection well in a pulse injection. Typically the period of this pulse injection is between about 4 and about 8 hours. Using this pulse injection allows the nitrate/nitrite solution to penetrate deep into the oil reservoir. The nitrate/nitrite solution may be added in multiple injection wells in contact with the same oil reservoir and with multiple production wells.

Nitrite ions are either supplied in the treatment solution and/or are formed during contact with the water and crude oil mixture in the oil reservoir as a product of nitrate ion metabolism by nitrate-reducing bacteria (NRB) in the mixture. In one embodiment at least a portion of nitrate ions are reduced to nitrite ions by NRB in the mixture. Sulfide concentration is reduced by direct chemical conversion of sulfide by nitrite (oxidation to sulfur or sulfate). Sulfide concentration is also reduced by promoting growth of sulfide oxidizing nitrate reducing bacteria (SONRB) by nitrate. In addition, production of sulfide is reduced by promoting growth of NRB by nitrate so that available carbon source in production fluid is used up by NRB thereby suppressing growth and production of sulfide by SRB. For example, about 93 ppm nitrate would be used in metabolism of about 50 ppm glucose, as calculated based on the assumption that all glucose carbon is converted to carbon dioxide.

In mixing of the nitrate/nitrite solution with the water and crude oil mixture in the reservoir, nitrate and/or nitrite ions diffuse into the mixture and are diluted. If no nitrite is provided in the nitrate/nitrite solution, nitrite ions are generated by NRB in the reservoir. In the mixture of water and crude oil with nitrate/nitrite solution, the concentration of nitrite ions (supplied or formed from nitrate) is sufficient to oxidize the majority of sulfide present to remove it from the water and crude oil mixture. In the mixture the concentration of nitrate ions is sufficient to promote growth of nitrate reducing bacteria (NRB) so that dissolved organic carbon (DOC) nutrients are used by NRB instead of by sulfate-reducing bacteria (SRB) to reduce new production of sulfide.

In addition, native or introduced populations of a specialized type of organisms that are sulfide oxidizing, nitrate reducing organisms (SONRB), that rely on sulfide oxidation to generate energy for growth, rather than oxidation of organic material, such as glucose used in the example above, may be present in the treated zone of the well. Growth and metabolism of SONRB are supported by the nitrate provided in the nitrate/nitrite solution. These bacteria may contribute to reducing the amount of sulfide in production fluid such that the concentration of nitrite needed to oxidize sulfide is reduced. Thus a lower amount of nitrite ions, or nitrate ions that are reduced to nitrite ions by NRB, is needed in the presence of SONRB.

A ratio of about 2:1 of nitrite ions:sulfide ions ($NO_2^-:S^{2-}$) is effective for oxidation of the sulfide, as shown herein in Example 2, with a 5:1 ratio supporting rapid oxidation. The concentration of sulfide in the oil and water production fluid of an oil reservoir may be readily measured by one skilled in the art, for example, by using a colorimetric assay based on methylene blue formation (Cline (1969) Limnol. Oceanogr. 14:454-458) or a paper strip assay such as Hydrogen Sulfide Test strips (#481197-1, Industrial Test Systems, Inc., Rock Hill, S.C. USA). The nitrate and/or nitrite ions in the injected nitrate/nitrite solution are in sufficient concentration to be effective once mixed with the water and crude oil mixture in the oil reservoir. In one embodiment the total concentration of nitrate and/or nitrite ions in the nitrate/nitrite solution is greater than about 3,000 ppm (0.3 wt %). The concentration of nitrate and/or nitrite ions used may be determined by the desired treatment goal as determined by one skilled in the art controlling well souring. The nitrate and/or nitrite ion concentration may be greater than about 3,000 ppm, 10,000 ppm, 25,000 ppm, 50,000 ppm, 75,000 ppm, 100,000 ppm, 125,000 ppm, 150,000 ppm, 175,000 ppm, 200,000 ppm, 225,000 ppm, 250,000 ppm, 275,000 ppm, 300,000 ppm, 325,000 ppm, or 350,000 ppm, or up to the solubility limit of the total of nitrate and/or nitrite ions in aqueous solution.

The nitrate/nitrite solution may be made using nitrate ions and/or nitrite ions in any form that are released in solution, such as in any soluble salt form such as calcium, sodium, potassium, ammonium, and any combination mixtures of salts. Typically sodium salts of nitrate and/or nitrite are used. These salts are dissolved in an aqueous solution from any suitable source of fresh water. Using fresh water, as opposed to a brine such as is typically used for injection water, provides a higher solubility limit for nitrate and nitrite ions.

A more concentrated nitrate/nitrite solution may be prepared and diluted into another fresh water source to be added to the injection well.

Combination of Nitrate/Nitrite Solution and MEOR Treatments

The present method may be used in oil reservoirs where microbially enhanced oil recovery (MEOR) methods (Brown, L. R., Vadie, A. A., Stephen, O. J. SPE 59306, SPE/DOE Improved Oil Recovery Symposium, Oklahoma, Apr. 3-5, 2000) are practiced. MEOR methods are used to improve oil recovery by the actions of microorganisms in an oil reservoir, which may include releasing oil from substrates and/or plugging highly permeable zones by formation of plugging biofilms. MEOR methods include injecting oil reservoirs with nutrient solutions that support microbial growth, and also may include inoculation of oil reservoirs with one or more microorganisms as disclosed for example in U.S. Pat. No. 7,776,795, U.S. Pat. No. 7,708,065, and commonly owned and co-pending US Pat. Appl. Pub. #20090263887, which are each incorporated herein by reference. Thus when using MEOR the production fluid may contain relatively higher levels of one or more carbon substrates to support growth of indigenous microorganisms as compared to when a non-MEOR process is used. Carbon substrates and/or microorganisms may be in excess in the oil reservoir, and in the oil and water mixture that enters the well becoming production fluid. When microorganisms are introduced in MEOR, there may be higher levels of microorganisms, and/or different populations of microorganisms, than without MEOR.

When higher levels of carbon substrates are present in production fluid, and SRB are present, higher levels of sulfide may be present in production fluid than encountered when not injecting a nutrient solution in a MEOR process. It is thus of particular importance to remove sulfide and reduce growth and production of sulfide by SRB that thrive on the injected nutrients when a MEOR process is used in an oil reservoir. When using a MEOR treatment, the nitrate/nitrite solution may be injected either before or after the nutrient, and optionally the microorganism, solution injection of the MEOR process. In one embodiment the nitrate/nitrite solution is injected at least a few days after the nutrient solution injection of the MEOR treatment. In other embodiments the nitrate/nitrite solution is injected at least about 7 days, 10 days, 14 days, 17 days, 21 days or more after the nutrient solution injection of the MEOR treatment. The period of time following nutrient injection will depend on factors including the size of the reservoir, the concentrations and types of nutrients introduced into the reservoir, and the growth of different types of microbes in the oil reservoir. The effectiveness of the nitrate/nitrite solution injected may be assessed by determining the amount of sulfide in the production fluid, and the timing of injection as well as the nitrate and/or nitrite ions concentration may be adjusted to maximize the sulfide reduction.

The oil reservoir may be treated multiple times with nitrate/nitrite solution either prior to or following multiple treatments with nutrient, and optionally microorganism, solution injection. In one embodiment, following nutrient solution injection that was followed after a period of time with nitrate/nitrite solution injection, there is a second round of nutrient solution injection followed again after a period of time with nitrate/nitrite solution injection, The second nutrient solution injection is performed a period of time following the first set of injections. The period of time between injections may be about one or more weeks, or one or more months. For example, the second nutrient solution injection may be about two to three months after the first nitrate/nitrite solution injection. The second nitrate/nitrite solution injection then follows at about a week later.

EXAMPLES

The present invention is further defined in the following Examples. It should be understood that these Examples, while indicating preferred embodiments of the invention, are given by way of illustration only. From the above discussion and these Examples, one skilled in the art may ascertain the essential characteristics of this invention, and without departing from the spirit and scope thereof, may make various changes and modifications of the invention to adapt it to various usages and conditions.
General Methods The meaning of abbreviations are used in this application are as follows: "hr" means hour(s), "min" means minute(s), "day" means day(s), "mL" means milliliters, "mg/mL" means milligram per milliliter, "L" means liters, "µL" means microliters, "mM" means millimolar, "µM" means micromolar, "nM" means nano molar, "µg/L" means microgram per liter, "pmol" means picomol(s), "° C." means degrees Centigrade, "° F." means degrees Fahrenheit, "mm" means millimeter, "ppm" means part per million, "g/L" means gram per liter, "mL/min" means milliliter per minute, "mL/hr" means milliliter per hour, "g" means gram, "mg/L" means milligram per liter,"
Sulfide Analysis Sulfide analysis was done using the methylene blue colorimetric assay with optical density read at 670 nm as described in (Cline (1969) Limnol. Oceanogr. 14:454-458).

Example 1

$NO_2^-$ Reactivity with Sulfide

A sodium nitrite solution was used to oxidize a sodium sulfide solution at room temperature in a closed system in order to look at the kinetics of the reaction and to prevent the volatilization of sulfide. Based on a balanced redox reaction, 1 mole of nitrite should be able to oxidize at least 0.5 mole of hydrogen sulfide. The nitrite and sulfide solutions used in the experiment were made up in artificial brine, which mimics the moderately high salinity of many oil reservoirs. The brine had the following composition: $CaCl_2.2H_2O$, 6.75 g, NaCl, 26.1 g, $Na_2SO_4$, 0.015 g, $MgCl_2.6H_2O$ g, 4.45, KCl, 0.7 g plus enough water to make a total of 500 ml of brine solution. The sulfide solution in brine was approximately 15 ppm $S^{2-}$. The nitrite solutions were approximately 50 ppm and 725 ppm $NO_2^-$. Two different treatments were run. In treatment 1 (Table 1) the nitrite:sulfide molar ratio was 29:1, which resulted in reaction conditions where nitrite was approximately 14.5 (i.e. 29/2) fold in excess of the nominal concentration needed to oxidize all sulfide in the reaction vessel. In treatment 2 (Table 1) the nitrite/sulfide molar ratio was 2.1:1, which resulted in reaction conditions where nitrite was approximately 1.05 (i.e. 2.1/2) fold in excess of the nominal concentration needed to oxidize all sulfide in the 26 ml crimp-cap-sealed glass reaction vessel. The sulfide remaining was assayed as described in General Methods at 10 min and 120 min of reaction time and the results are given in Table 1.

Although both treatments had enough nitrite to oxidize all of the sulfide present based on the redox balanced equation, only treatment 1 showed complete removal of sulfide at the 10 minute and 2 hour observation time points (Table 1). These data show that the oxidation reaction occurs rapidly when the nitrite:sulfide ratio is in excess of 2.1:1, and occurs effectively but more slowly when the ratio is 2.1:1.

TABLE 1

Changes in sulfide concentrations with time following the addition of nitrite

| Treatment | $NO_2^-$:$S^{2-}$ molar ratio in reactor | Reaction Time, min | ppm $S^{2-}$ added to reactor | Observed ppm $S^{2-}$ following $NO_2^-$ addition | Expected ppm $S^{2-}$ after $NO_2^-$ addition |
|---|---|---|---|---|---|
| 1 | 29 | 10 | 19 | 0 | 0 |
|   |    | 120 | 19 | 0 | 0 |
| 2 | 2.1 | 10 | 19 | 15 | 0 |
|   |    | 120 | 19 | 15 | 0 |

Example 2

$NO_2^-$ Reactivity with Sulfide

Titration of Molar Ratios Needed for a Rapid Reaction

A range of nitrite:sulfide ratios were tested to determine the molar ratio needed to cause a rapid oxidation of sulfide. The nitrite and sulfide solutions used in the experiments were made up in artificial brine as described in Example 1. Experiments were performed as described in Example 1 using eight different treatments. The nitrite/sulfide molar ratios used were 2, 5, 10, 15, 20, 25, 30, and 35. Results given in Table 2 showed that the reaction rate remained slow at a ratio of 2, as seen in the previous Example, and at a ratio of 5:1 or higher the reaction occurred rapidly with sulfide becoming undetectable in 10 minutes or less.

TABLE 2

Changes in sulfide concentrations with time following the addition of nitrite at $NO_2^-:S^{2-}$ ratios from 2:1 to 35:1

| $NO_2^-:S^{2-}$ molar ratio in reactor | Reaction Time, min | ppm $S^{2-}$ added to reactor | Observed ppm $S^{2-}$ following $NO_2^-$ addition |
|---|---|---|---|
| 2:1 | 10 | 26 | 8.9 |
| | 120 | 26 | 3.8 |
| 5:1 | 10 | 26 | 0 |
| | 120 | 26 | 0 |
| 10:1 | 10 | 26 | 0 |
| | 120 | 26 | 0 |
| 15:1 | 10 | 26 | 0 |
| | 120 | 26 | 0 |
| 20:1 | 10 | 26 | 0 |
| | 120 | 26 | 0 |
| 25:1 | 10 | 26 | 0 |
| | 120 | 26 | 0 |
| 30:1 | 10 | 26 | 0 |
| | 120 | 26 | 0 |
| 35:1 | 10 | 26 | 0 |
| | 120 | 26 | 0 |

Example 3 (Prophetic)

Treatment of a Subterranean Site Using Nitrate/Nitrite Following a MEOR Process that Utilizes Organic Nutrients In this example, an injector well is treated for microbial enhanced oil recovery using only an organic nutrient. A solution of 400 ppm yeast extract plus 40000 ppm of disodium malate is fed batch wise to an oil reservoir through an injection well. This is accomplished by pumping this nutrient solution down the injector well for a period of 4 hours at the normal injection rate, where it flows into the oil reservoir. The intent of this treatment is to improve oil recovery using the treatment to stimulate microbes in the reservoir leading to release more oil from the formation. After pumping these nutrients into the reservoir, the injection well is put on injection for 2 days and then it is shut in for a period of 2 weeks while the microbial population in the well consumes the malate. Analysis of water in the reservoir and of the injection water pumped into the reservoir before and after the nutrient treatment show that there are sulfate reducing bacteria present and that there is 100 ppm sulfate in these waters. It is therefore anticipated that some sulfide will be produced from the sulfate reducing bacteria metabolizing the malate or the metabolic byproducts of the malate. After the 14 day shut in, the well is put back on normal injection. Two weeks later, a solution of 3 wt % nitrate and 20 wt % nitrite is pumped at the normal injection rates for 4 hours into this injection well. The nitrate/nitrite solution goes into the oil reservoir where any sulfide produced by the organic only treatment done 4 weeks early is oxidized. In addition, any residual carbon source not yet mineralized is consumed by nitrate reducing bacteria that are already present in the well. Production fluids from production wells surrounding this injection are sampled and analysis of the well effluent shows no signs of sulfide in the produced water. The production wells that surround this injection well show a substantial increase in oil production amounting to an extra 30% increase in production rate for a period of six months after the MEOR treatment. In contrast an identical nearby injection well that communicates with a different set of producer wells in the same reservoir is treated in the exact same fashion without the nitrate/nitrite post treatment. It is observed that there is 50 ppm of sulfide present in the water produced by at least one of the production wells that surround this treated injector well 6 months after the injection well is treated. The production wells that surround this injection well show a substantial increase in oil production amounting to an extra 30% increase in production rate for a period of six months after the MEOR treatment.

What is claimed is:

1. A method for treating an oil reservoir comprising:
    a) providing an injection well in an oil reservoir;
    b) adding a nitrate/nitrite aqueous solution comprising nitrate ions, nitrite ions, or a mixture of nitrate and nitrite ions to the injection well wherein said solution flows down the well and into the oil reservoir, and contacts a mixture of water and oil in the oil reservoir that forms production fluid; and
    c) producing the production fluid through at least one production well that is in contact with the injection well;
    wherein a sulfide concentration in the production fluid is reduced as compared to a sulfide concentration in production fluid obtained with omission of step (b), wherein the total concentration of nitrate ions, nitrite ions, or the mixture of nitrate and nitrite ions in the aqueous solution of (b) is greater than about 3,000 ppm.

2. The method of claim 1 wherein the total concentration of nitrate ions, nitrite ions, or the mixture of nitrate and nitrite ions in the aqueous solution of (b) is greater than about 10,000 ppm.

3. The method of claim 1 wherein the nitrate/nitrite aqueous solution is prepared in fresh water.

4. The method of claim 1 wherein at least a portion of nitrate ions of (b) are reduced to nitrite ions in the water and oil mixture by nitrate reducing bacteria.

5. The method of claim 1 wherein prior to or after adding nitrate/nitrite aqueous solution of step (b) the oil reservoir is injected with a nutrient solution and optionally with at least one microorganism.

6. The method of claim 5 wherein steps of injecting a nutrient solution and adding nitrate/nitrite aqueous solution of step (b) are repeated.

7. The method of claim 5, wherein the nutrient solution is injected about 7 days to about 21 days before the nitrate/nitrite aqueous solution of step (b) is added.

8. The method of claim 1 wherein the aqueous solution of (b) comprises nitrite ions.

9. The method of claim 1 wherein the aqueous solution of (b) comprises nitrite ions and omits nitrate ions.

10. The method of claim 1, wherein a ratio of the nitrite ions to sulfide ions is between about 2:1 to about 5:1 in the production fluid.

11. The method of claim 1, wherein a ratio of the nitrite ions to sulfide ions is between about 5:1 to about 35:1 in the production fluid.

* * * * *